United States Patent [19]
Paoluccio

[11] Patent Number: 5,080,403
[45] Date of Patent: Jan. 14, 1992

[54] APPARATUS FOR CONNECTING A BRANCH DUCT TO ANOTHER DUCT

[76] Inventor: John A. Paoluccio, P.O. Box J; Salida Blvd., Salida, Calif. 95829

[21] Appl. No.: 624,643

[22] Filed: Dec. 10, 1990

[51] Int. Cl.$^5$ ............................................. F16L 51/02
[52] U.S. Cl. .................................. 285/229; 285/424; 285/189
[58] Field of Search ............... 285/226, 227, 228, 229, 285/158, 189, 424, 177

[56] References Cited

U.S. PATENT DOCUMENTS

| | | | |
|---|---|---|---|
| 1,197,496 | 9/1916 | Jobling | 285/229 |
| 1,586,706 | 6/1926 | Russell | 285/12 |
| 2,352,038 | 6/1944 | Tolke | 285/229 |
| 2,632,658 | 3/1953 | Mertz | 285/229 |
| 3,811,714 | 5/1974 | Pintard | 285/229 |
| 4,283,078 | 8/1981 | Ross et al. | 285/229 |

FOREIGN PATENT DOCUMENTS

| | | | |
|---|---|---|---|
| 647237 | 8/1962 | Canada | 285/229 |
| 853229 | 10/1952 | Fed. Rep. of Germany | 285/229 |
| 2628603 | 12/1977 | Fed. Rep. of Germany | 285/229 |
| 2113311 | 6/1972 | France | 285/229 |
| 14137 | 9/1892 | United Kingdom | 285/229 |
| 119471 | 2/1919 | United Kingdom | 285/229 |

Primary Examiner—Eric K. Nicholson
Attorney, Agent, or Firm—Robert S. Smith

[57] ABSTRACT

Apparatus for readily connecting a round branch duct take off fitting of a forced air heating or air conditioning system to any size diameter round duct main with one size semi-flexible duct take off fitting. A hole is cut into the main round duct. The take off fitting is rigidly fastened at the contact tangent point of the main duct and the flat surface of the fitting. A bendable base flange, that is connected to a semi-flexible tubular member, is then formed around the main round duct and is fastened to same. As the bendable base flange is formed the semi-flexible fabric portion deforms to accommodate any size diameter main duct. Gaskets between connecting surfaces prevent air leakage.

22 Claims, 8 Drawing Sheets

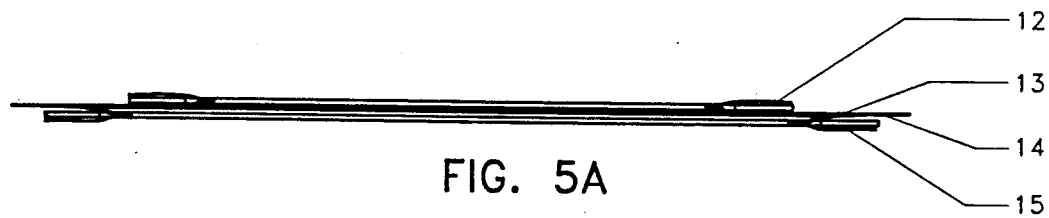
FIG. 5A
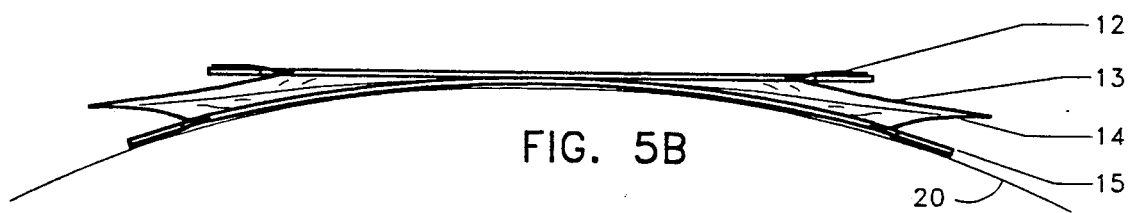
FIG. 5B
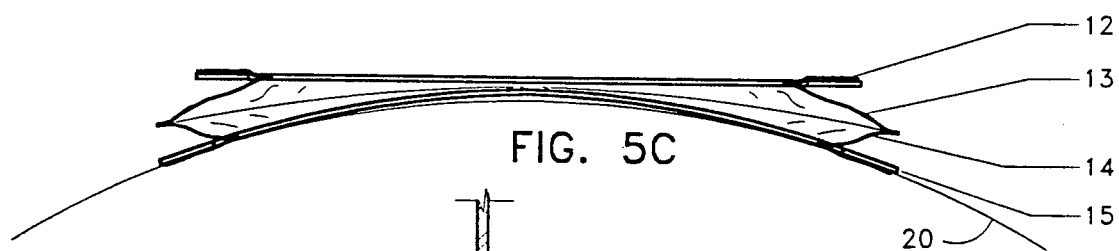
FIG. 5C
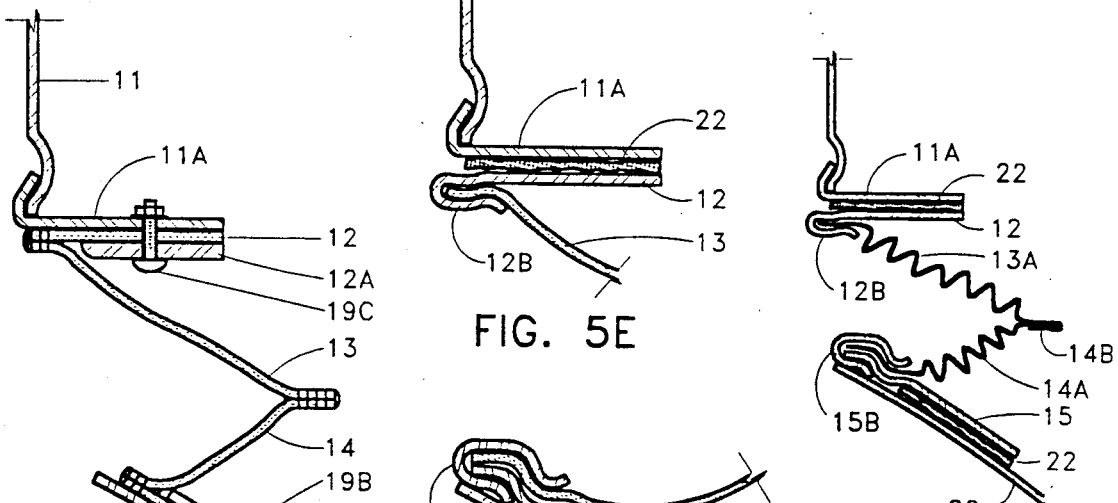
FIG. 5D
FIG. 5E
FIG. 5F
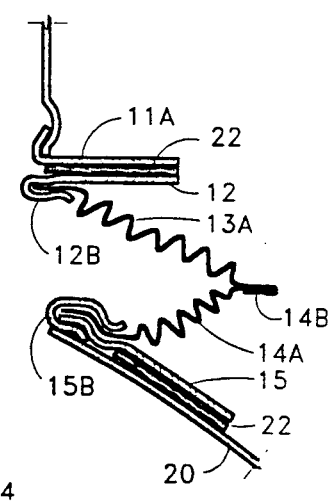
FIG. 5G

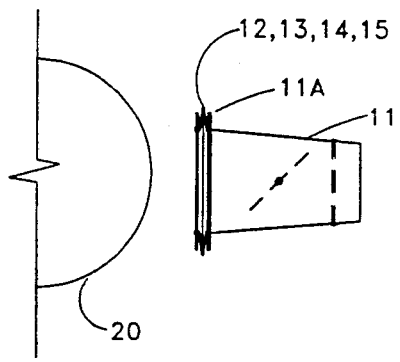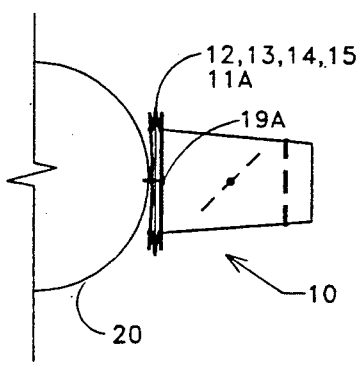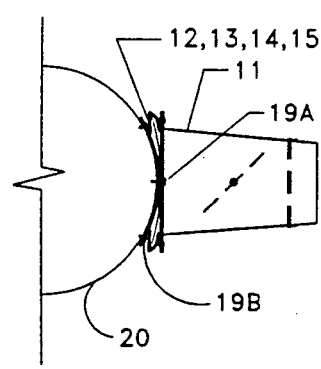
FIG. 7A  FIG. 7B  FIG. 7C
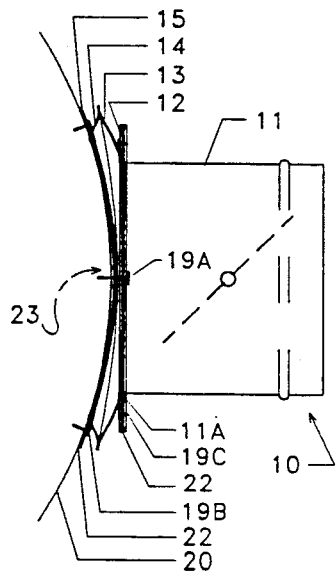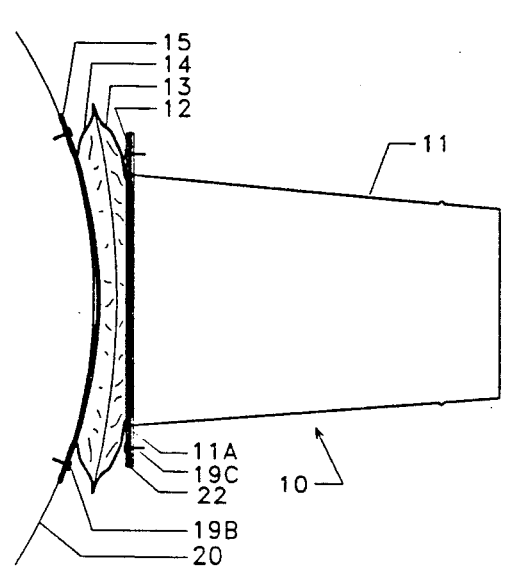
FIG. 8  FIG. 9
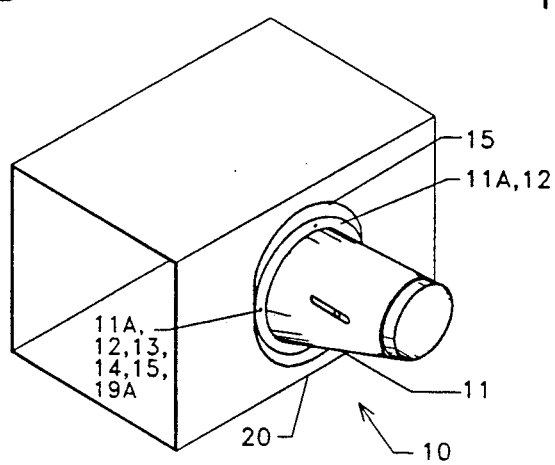
FIG. 10

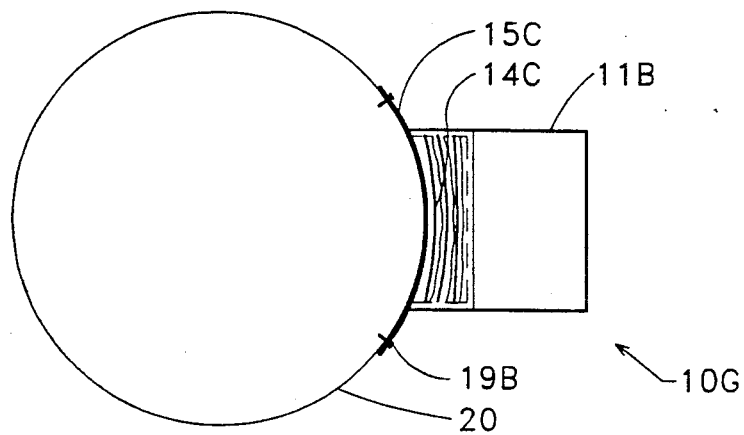
FIG. 13A
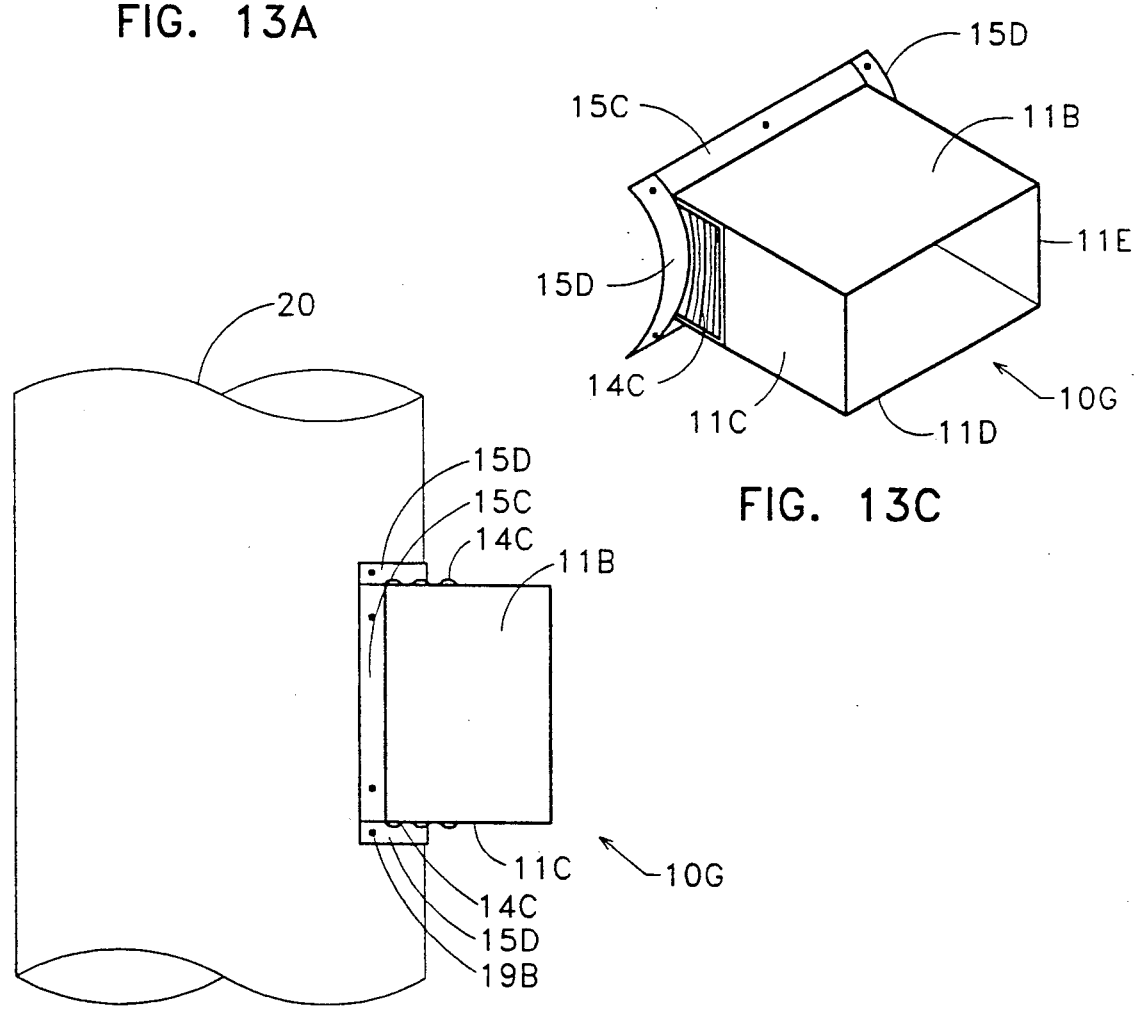
FIG. 13C
FIG. 13B

APPARATUS FOR CONNECTING A BRANCH DUCT TO ANOTHER DUCT

BACKGROUND OF THE INVENTION

The invention relates to heating, ventilating and air conditioning duct work and particularly to round duct work and particularly to fittings to connect branching ducts from main ducts. In the air conditioning, heating and ventilation industry, duct take off fittings are used at every connection between a branch duct or fitting and the main duct. Round duct work is generally preferred because it is less expensive, is readily available, is structurally sound, is easy to provide with exterior insulation and is easy to install. The primary problem in using round ductwork for mains (main ducts) is that there has been no simple and practical way to install branch duct take-off fittings.

Factories and large sheet metal shops can provide special sheet metal fittings to suit each size main duct but this requires extensive planning, special ordering and the stocking of a tremendous quantity of various sizes of fittings.

For example, it would be common to connect a 6" round branch duct to a 12", 14", 16", 18", 20", 22", 24", ..., 36" round main duct. This would require approximately ten fittings for every branch duct take-off size. With lack on any previous practical method of connecting a round branch to a round main duct, industry has widely adopted rectangular main ducts. This allows for fairly simple connecting of branch ducts to the main. Of course using rectangular main ducts requires considerably more costs and complex fabrication methods with more labor, material, air leakage, and in recent years an environmental concern with interior duct sound and insulation lining. The lining can erode, help support mold growth and can add to interior air pollution.

There are several present methods of connecting round branch ducts to round mains. In all cases special complex sheet metal patterns are required to suit the main duct curvature for fabrication.

The fitting may include a round duct section the size of the main with a duct take off fitting formed to suit each size curvature. Another type is a special saddle that fits only one main duct size. In all cases, it takes considerable labor, time, complex calculations and special equipment to fabricate these fittings. Due to these complexities many sheet metal installers, change the main duct to rectangular ductwork because of the ease of installing fittings. Rectangular ductwork is less efficient, less rigid, has a greater pressure drop for a given cross-sectional area, and is more costly to fabricate, install, and insulate than round ductwork.

The prior art include U.S. Pat. Nos.
3,915,477
3,998,480
4,009,894
4,249,758
4,418,943
4,491,124
4,569,110
4,573,715
4,620,729

The apparatus described therein does not allow for interconnection of a range of round duct sizes.

An object of this invention is to provide a simple means of connecting round branch ducts to any size round main duct.

It is an object of the invention to provide a simple and practical way to install branch duct take-off fittings.

It is another object of the invention to provide apparatus which will fit a wider range of main duct sizes and thus inventories for such apparatus may thus be maintained at less than one tenth the quantity required for prior art fittings.

Still another object of the invention is to provide apparatus which permits easy installation of exterior insulation of the main round duct in a manner that is simple and inexpensive.

It is an object of the invention to provide apparatus which is inexpensive to manufacture and which requires a minimum of labor to install.

SUMMARY OF THE INVENTION

It has now been found that these and other objects of the invention may be attained in apparatus for joining a circular cross-section duct to an associated main duct which includes a bellows including a bendable generally planar first ring member manufactured of a first material in addition to second and third generally planar ring members manufactured of a second material. The second material is more flexible than the first material. A fourth generally planar ring member is manufactured of a third material that is more rigid than the first material. The first, second, third and fourth ring members are successively joined together to form the bellows.

In some forms of the invention the means joining the first, second, third, and fourth ring members at two diametrically opposed points on the ring members. The means may join the ring members in closely spaced relationship at the juncture with the means. The associated main duct may be circular and the first ring member may be disposed in generally tangential relationship at least at initial installation and the means may be disposed at points of tangency between the first ring member and the associated main duct.

The first and third materials may be metals and the second material may be a fabric which may be fabricated from a glass fiber. The second material may be a polychloroprene. The apparatus may further include a generally circular cross-section elongated duct having a flange at one axial extremity and the flange may be disposed in face to face engagement with the fourth ring member.

A stiffener may extend from the elongated duct to the associated main duct. The elongated duct may be a truncated conical shaped duct. The ring members may be joined successively by adhesive bonding at peripheral portions thereof. A damper is disposed in the elongated duct in some embodiments.

In other embodiments the second and third generally planar ring members are molded as one piece.

BRIEF DESCRIPTION OF THE DRAWING

The invention will be better understood by reference to the accompanying drawing in which:

FIG. 5A is a partially schematic view of the semi-flexible portion of the fitting in a flat or folded position.

FIG. 5B is a partially schematic view of the semi-flexible portion in a partially expanded position.

FIG. 5C is a partially schematic view of the semi-flexible portion in a fully expanded position.

FIG. 5D is a fragmentary partially schematic view to an enlarged scale of a portion of the semi-flexible portion.

FIG. 5E is a partially schematic view of the semi-flexible portion of another form of the invention.

FIG. 5F is a partially schematic view of another form of the invention.

FIG. 5G is a fragmentary partially schematic view to an enlarged scale of a portion of the semi-flexible portion wherein the semi-flexible portion is corragated or deformed aluminum.

FIG. 7A is a partially schematic view of a main round duct and a fitting and branch duct in exploded relation.

FIG. 7B is a view similar to FIG. 7A illustrating the duct take off fitting rigidly fastened at the tangent connection point.

FIG. 7C is a view similar to FIG. 7B illustrating the bendable flange fastened to the main and the branch duct.

FIG. 8 is an elevational view of another embodiment of the invention with a one piece pre-molded flexible connector with a flat bendable section and a round extruded section that can clamp to a round fitting without a flange.

FIG. 9 is an elevational view showing one form of the apparatus in accordance with the invention installed to allow more relative movement between the respective ducts and to provide improved vibration and sound isolation.

FIG. 10 is a perspective view of the apparatus in accordance with one form of the invention connected to a rectangular duct.

FIG. 13A is a partially schematic elevational view of another embodiment of the invention constructed to connect a square duct to a round main duct.

FIG. 13B is a plan view of the apparatus shown in FIG. 13A.

FIG. 13C is a perspective view of the fitting shown in FIGS. 13A and 13B.

DESCRIPTION OF THE PREFERRED EMBODIMENT

Figure 1A:
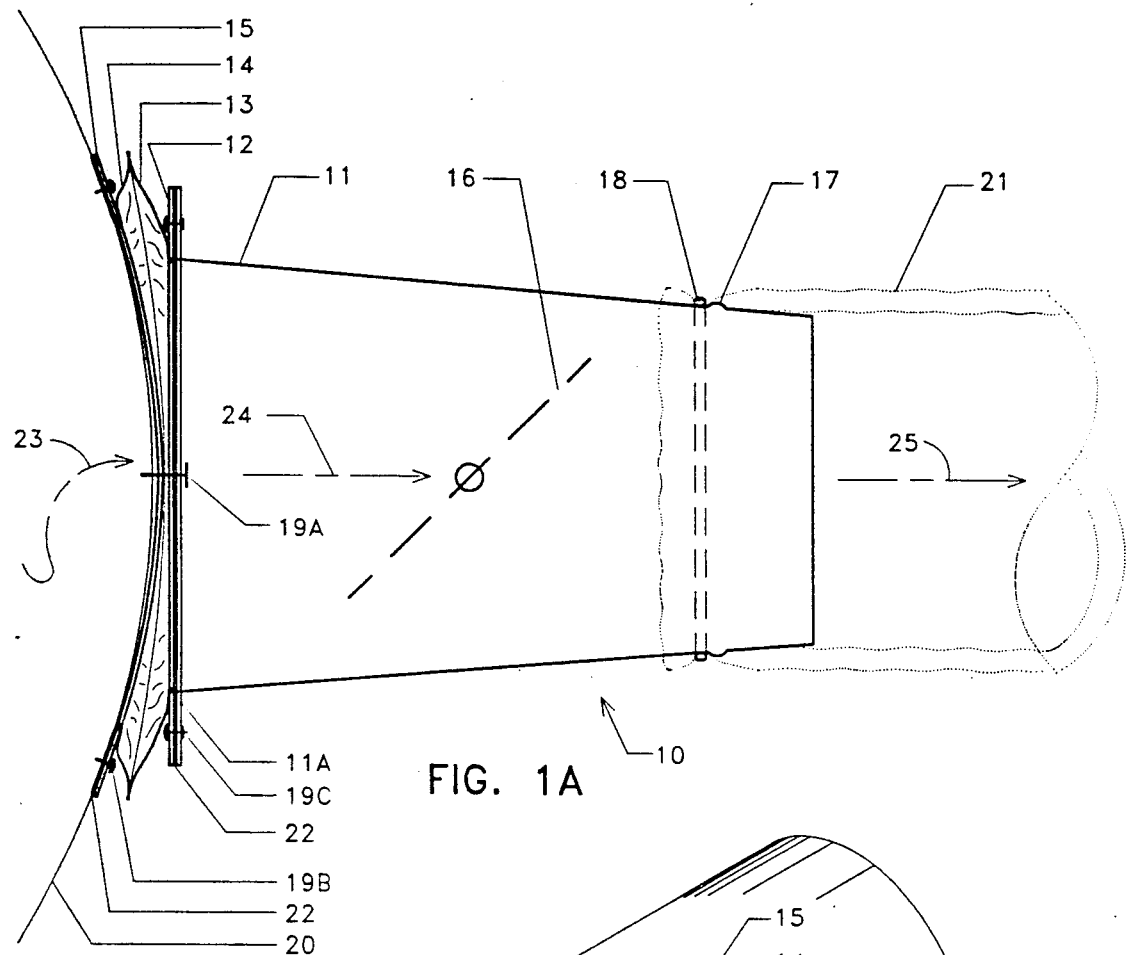
FIG. 1A is a fragmentary partially elevational schematic view of the apparatus in accordance with one form of the invention connected to a round main duct.

This invention enables a novel simple, practical, efficient and effective means of connecting virtually any round branch duct take-off to any diameter round main duct. Only one size branch duct take-off fitting will fit virtually any diameter round duct main. This invention allows for all conventional ductwork fittings and branch ducts to be installed after the main round duct runs have been installed. The invention eliminates the need for ordering or fabricating numerous special fittings. Stock inventories need only maintain less than one tenth the normal variety of fittings.

The invention makes it easy to install exterior insulation on the main round duct in a manner that is simple and inexpensive. This also allows for a smooth, clean, safe interior metal surface for the higher velocity main air flow. The net result, of this substantial improvement over prior art, will be a higher quality, safer, more efficient air distribution system at lower cost.

Referring now to FIGS. 1–12 there is shown one form of the apparatus in accordance the invention that includes a semi-flexible duct take-off fitting 10. As best seen in FIGS. 1A–5D the fitting 10 is connected to a round main duct 20 by a bendable sheet metal flange ring member 15 which is bonded or fastened, near the inside diameter thereof, to a semi-flexible fabric ring member 14 that extends outward, both radially and away from the main duct 20. The fabric ring member 14 is bonded at its outside diameter to a return portion or semi-flexible fabric ring member 13 that in turn is bonded to a rigid flange ring member 12 that is securely fastened to the base flange 11a of the truncated conical portion or cone 11 portion of a static pressure take off fitting 10.

The cone 11 portion includes a balancing damper 16. A rolled ridge 17 is also provided on the cone 11 to aid in holding a connecting flexible duct 21 with a securing band clamp 18. A bendable sheet metal stiffener 27, shown in FIGS. 2A, 2B and 2C will aid in making the fitting 10 rigid. It will be seen that the angle stiffener will be bent differently for cooperation with different duct sizes.

Figure 1B:
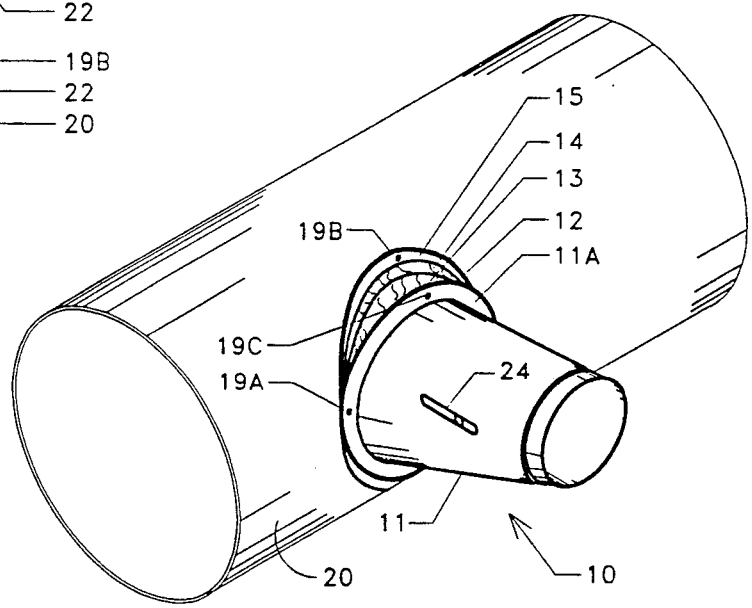
FIG. 1B is a partially schematic perspective view of the apparatus shown in FIG. 1A.
Figure 2A:
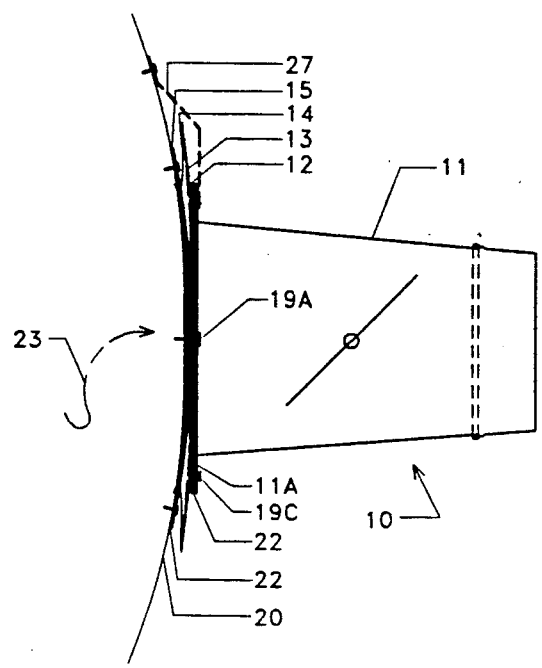
FIG. 2A is view similar to the view of FIG. 1A showing the same embodiment of the invention connected to a large diameter main duct.
Figure 2C:
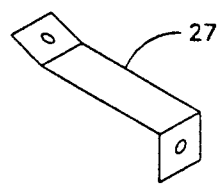
FIG. 2C is a perspective view of bracket used to stiffen the connections for some applications.
Figure 2B:
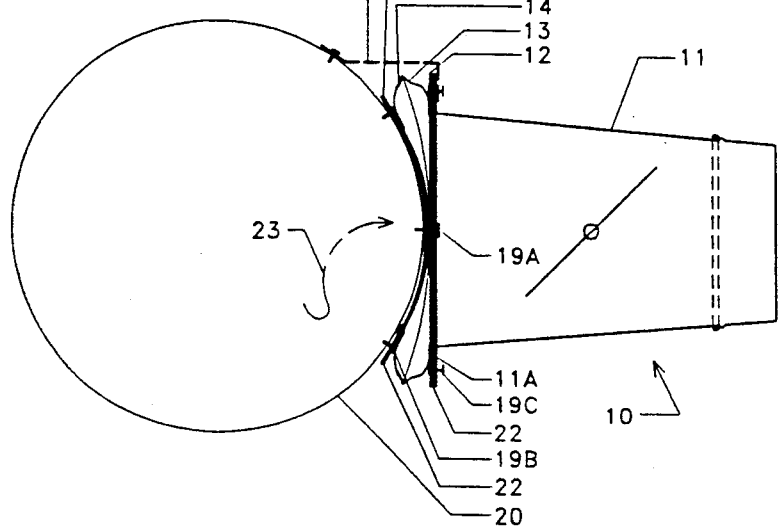
FIG. 2B is view similar to the view of FIG. 2A showing the same embodiment (and size) of the invention connected to a smaller diameter main duct.
Figure 3:
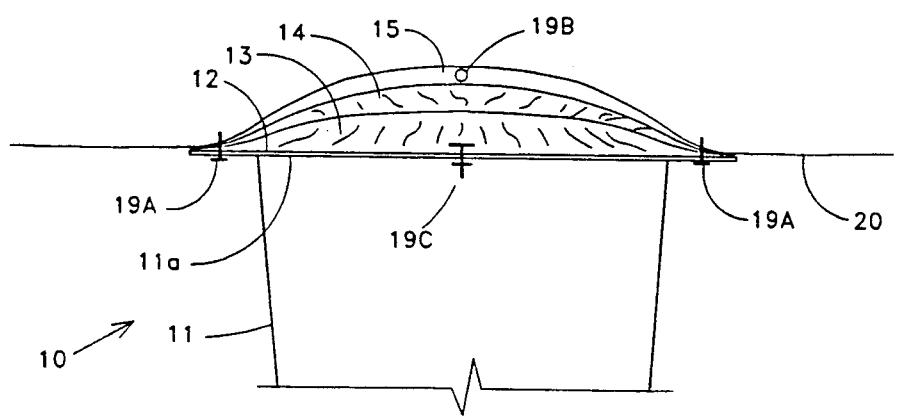
FIG. 3 is a fragmentary plan view of the fitting of FIG. 1A connected to a round duct with the semi-flexible portion expanded.
Figure 4B:
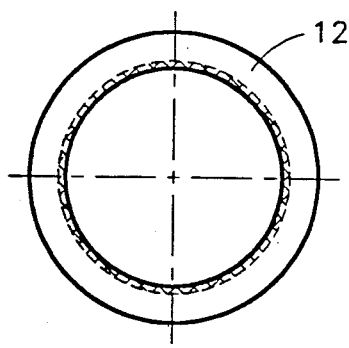
FIG. 4B is a plan view of the flange which is part of the apparatus of the present invention and which engages the flange of the cone.
Figure 4C:
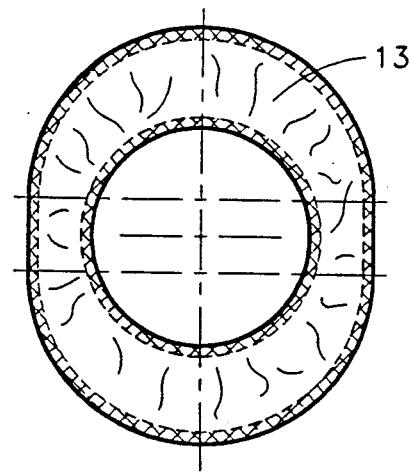
FIG. 4C is a plan view of one of the fabric ring members used in the apparatus of the present invention.
Figure 4A:
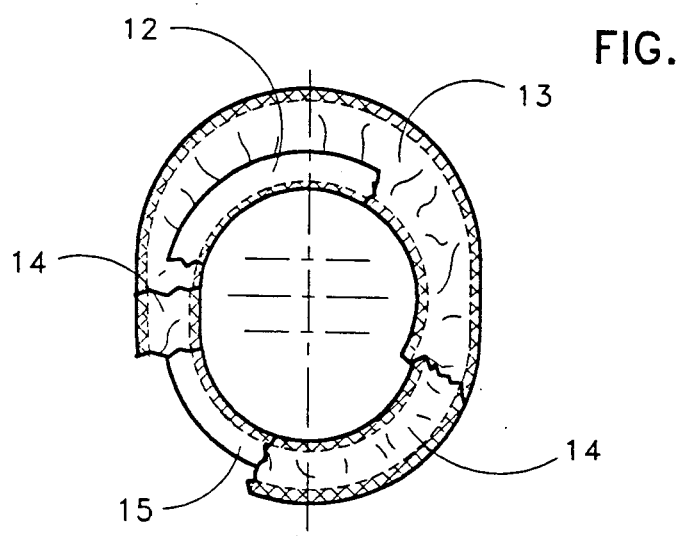
FIG. 4A is a sectional view partially broken away showing the ring flanges and fabric portions of the semi-flexible portion of the fitting.
Figure 4E:
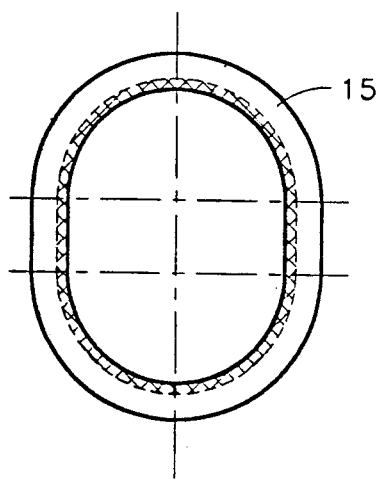
FIG. 4E is a plan view of the flexible flange of the fitting closest to the main duct.
Figure 4D:
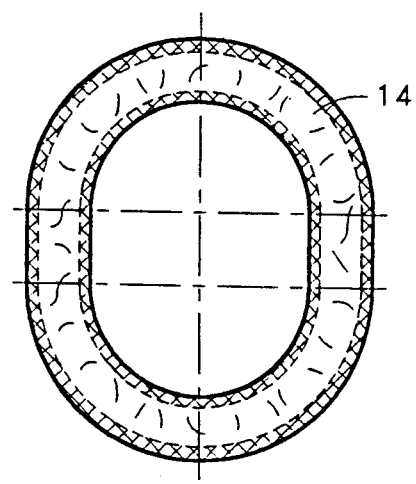
FIG. 4D is a plan view of a second fabric ring member used in the apparatus of the present invention.

Two primary fasteners 19a securely hold the fitting 10 against the main or main duct 20. As best seen in FIG. 2B the flange ring member 12 is disposed in substantially tangential relationship to the main 20. At opposed points on opposite sides of the flange ring member 12 the two fasteners 19a extend through the main 20, ring member 15, fabric ring member 14, fabric ring member 13, flange ring member 12, and base flange 11a and hold these elements in touching face to face relationship as best seen in FIG. 1B. A sealing gasket or adhesive 22 is located between flange 12 and base flange 11a. Similarly, a gasket or adhesive 22 is disposed between the flange 15 and the main 20 to prevent air leakage. The entry portion of the cone 11 at flange 11a is larger than the exit portion of cone 11 near raised ridge 17 to allow for air flow 23 to more uniformly enter the fitting 10 relying more on air static pressure than velocity pressure. The air flow 24 is balanced by damper 16 to provide a proper flow rate (indicated by the arrow 25) entering the branch duct 21. A bracket 27 may connect the fitting 10 to the main 20 in some forms of the invention.

The semi-flexible fabric ring members 13, and fabric ring members 14 are, in the preferred embodiment, fire retardant polychloroprene coated glass fabric with a weight of 30 ounces per yard in the preferred embodiment. Polychloroprene is the generic term for Dupont's NEOPRENE. Numerous other fabric types and coating materials may be used depending on the application. In some embodiments a flexible aluminum sheet may be used. In another embodiment may further include an interior aluminum foil liner (not shown) which would allow the air flow 24 to only come in contact with a metal surface. In lieu of coated fabric, deformable aluminum sheet metal could be used. Advantageously, the aluminum will deforms one time during installation and then remains in a fixed position. The aluminum sheet metal may have a series of ridges to aid in deforming it. Other metals and materials may be used for various applications that may include a wide range of temperatures, pressures, and gases.

A unique feature of this invention is the shape of the semi-flexible portion of the apparatus. Referring particularly to FIGS. 4A–5D this portion is constructed of a non-stretch neoprene coated glass fabric or the like. As best seen in FIGS. 4A–4E the assembly is manufactured of individual flat shaped pieces and bonded together in such a way that for example, with flange 12 remaining flat, both flexible fabric portions 13, 14, and connecting bendable flange 15 can move from a totally flat position to a curved position. This is best shown in FIGS. 5A–5D which show the flat and expanded positions. The flange 15 extends partially around a round main duct, with minimal stress on the fabric portions of the fitting 10. The unique shape of the semi-flexible portions allow it to adapt to a wide range of main ducts 20 with a natural circular curvature without fabric stress.

Referring particularly to FIGS. 7A–7C there are shown sequential steps in attaching the fitting 10 to the main 20. More particularly, the fitting 10 is positioned in aligned relationship to an opening (not shown) in the main duct 20. Fasteners 19A secure the flange 12 to the main 20 at two opposed points along the line of tangency between the planar flange 15 and the round main 20. Thereafter, the flange 15 is bent to seat firmly against the main 20 with the gasket or adhesive 22 disposed therebetween.

Figure 6:
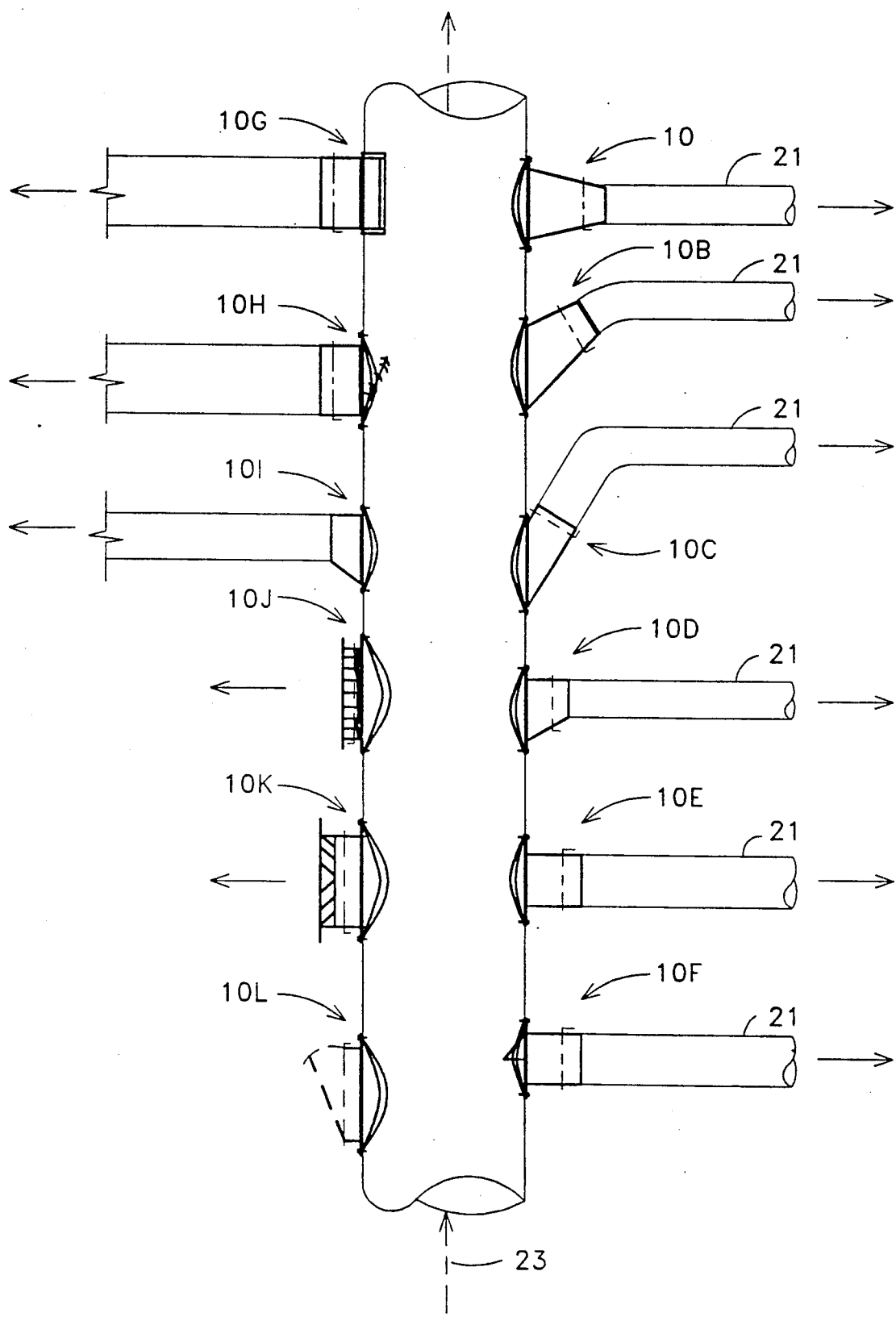
FIG. 6 is a plan view of a round main duct with a plurality of branching ducts coupled to the main duct by various forms of the apparatus in accordance with the invention.

Referring particularly now to FIG. 6 there are shown certain variations in the apparatus in accordance with the invention. They are identified by the following reference numerals:

10 Static pressure duct take off-round fitting.
10B Angle static pressure duct take off-round fitting.
10C Angle branch round duct take off.
10D Circular boot duct take off.
10E Round branch duct take off.
10F Round branch duct take off with scoop.
10G Rectangular branch duct take off.
10H Rectangular branch duct take off with extractor.
10I Rectangular boot duct take off.
10J Rectangular air register-direct tap.
10K Round air diffuser-direct tap.
10L Duct access door.

Referring specifically now to FIG. 8 there is shown another embodiment of the invention with a one piece pre-molded flexible connector with a flat bendable section and a round extruded section that can clamp to a round fitting without a flange. FIG. 9 is an elevational view showing one form of the apparatus in accordance with the invention installed to allow more relative movement between the respective ducts and to provide improved vibration and sound isolation.

In FIG. 10 there is shown a perspective view of the apparatus in accordance with one form of the invention connected to a rectangular duct.

Figure 11:
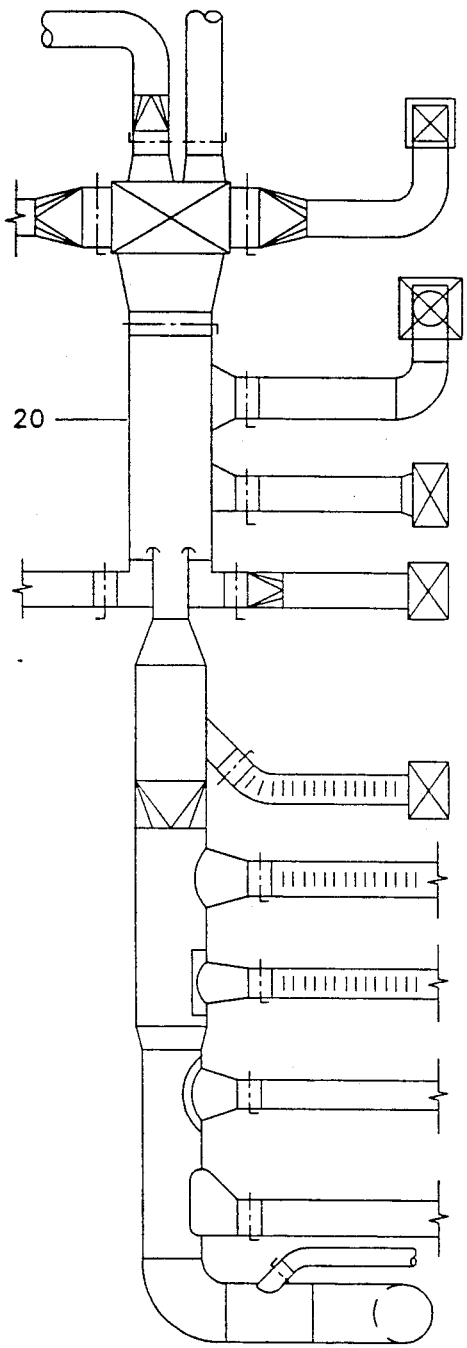
FIG. 11 is a plan view of a conventional duct system.
Figure 12:
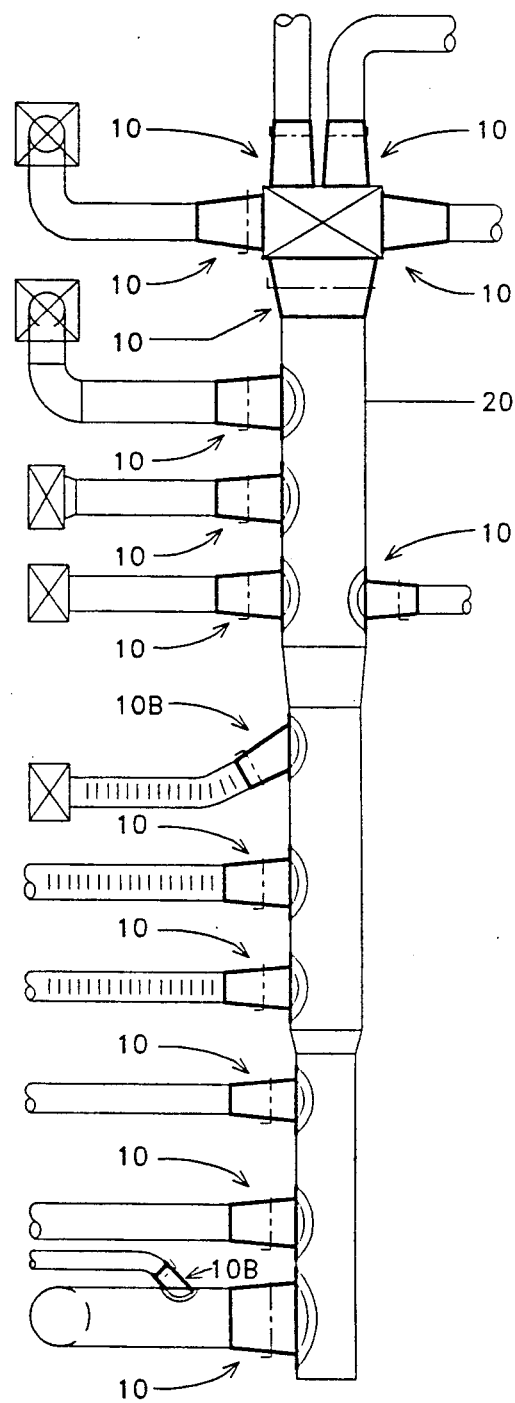
FIG. 12 is a plan view of the equivalent duct arrangement using the fittings in accordance with the invention

FIG. 11 is a plan view of a conventional duct system which contrasts with the FIG. 12 plan view of the equivalent duct arrangement using the fittings in accordance with the invention.

Although the figures show the invention being used for supply air, the invention will work equally well in return air, exhaust and industrial applications. The semi-flexible member of the invention may be adapted to a wide variety of fittings.

This Semi Flexible duct take-off fitting has the unique ability to conform from a flat surface to a curved surface, thereby accommodating any size diameter main duct.

Referring now to FIGS. 13A–13C there is shown a round main duct 20 provided with a fitting 10G which is adapted to cooperate with a rectangular cross section duct. The fitting 10G includes planar top and bottom members 11B and 11D and planar side members 11C and 11E. The members 11B and 11C are fixed to flanges 15c that attach to the main duct 20. Semi-flexible side panels 14C, 14C are fixed respectively to the flanges 15D, 15D. As in the other embodiments the deformability of the flanges 15D and 15C allows interconnection with a wide range of main duct 20 sizes.

This invention dramatically reduces the need for stocking the tremendous number of take-off fittings and other connecting members to joining round branch members to various size main size that are presently required. It also eliminates the sophisticated sheet metal patterns that are presently required for round duct take-off.

The use of this invention has numerous advantages over the prior art including:

1. Reduces time, labor, and cost of fabrication.
2. Reduces time, labor, and cost of installation.
3. Allows for all round ducts to be installed without worrying as to where the exact branch duct will connect. This reduces shop drawing preparation time and main installation time.
4. Round duct mains are the most efficient for reduced air pressure drop and have less air leakage than rectangular ducts which results in energy savings from fan losses, and heating and cooling energy.
5. The overall ductwork installation will require less time, far fewer variety of fittings, less labor, less chance for error, and less planning time.
6. Each fitting has a larger inlet area at the main than at the branch end. This allows for a static pressure duct take-off feature which is ideal for improved air balancing and lower pressure drop and less energy use.
7. Reduces the variety of stock fittings to less than 1/10 the present requirements.
8. This invention includes the following built in features in one fitting:
   a. Connecting bendable flange to the main duct.
   b. Semi-Flexible fabric portion that is adjustable.
   c. Rigid connecting flange to sheet metal portion. Fastened or press roll formed to cone portion.

d. Tapered one piece cone for static pressure take off feature.

e. A balancing damper installed in the cone portion. This eliminates a separate damper section.

f. A roll formed ridge near end to allow for secure fastening of flexible duct branch that is slipped over the end.

g. One piece formed sheet metal from cone to end that eliminates several joints that eliminates air leakage.

h. The fitting can also connect to rectangular duct with or without the semi-flexible portion.

i. Insulation wrapped around the exterior of all round mains is simpler and less expensive than lining rectangular ductwork and eliminates the erosion effect of fiberglass lining in the airstream.

j. The invention allows for a certain amount of misalignment and provides for certain vibration elimination along with less noise and damage from expansion, contraction, and seismic movement.

This invention has a wide range of applications in heating, air conditioning, and exhaust air systems in residential, commercial and industrial facilities and will result in more economic systems with a savings in first cost and operating cost and will allow for the safe practical use of round ductwork.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. Apparatus for joining a circular cross-section duct to an associated main duct which comprises:
   a bellows including a bendable generally planar first ring member manufactured of a first material, second and third generally planar ring members manufactured of a second material, said second material being more flexible than said first material, and a fourth generally planar ring member manufactured of a third material, said third material being more rigid than said first material, said first, second, third and fourth ring members being successively joined together to form said bellows.

2. The apparatus as described in claim 1 further including:
   means joining said first, second, third, and fourth ring members at diametrically opposed points on said ring members.

3. The apparatus as described in claim 2 wherein:
   said means joins said ring members in closely spaced relationship at the juncture with said means.

4. The apparatus as described in claim 3 wherein:
   the associated main duct is circular and said first ring member is disposed in generally tangential relationship at least at initial installation and said means are disposed at points of tangency between said first ring member and the associated main duct.

5. The apparatus as described in claim 4 wherein:
   said first and third materials are metals.

6. The apparatus as described in claim 5 wherein:
   said second material is a fabric.

7. The apparatus as described in claim 6 wherein:
   said second materials is fabricated from a glass fiber and coated with polychlorprene.

8. The apparatus as described in claim 7 wherein:
   said second material is a deformable semi-rigid material.

9. The apparatus as described in claim 8 further including:
   a generally circular cross-section elongated duct having a flange at one axial extremity, said flange disposed in face to face engagement with said fourth ring member.

10. The apparatus as described in claim 9 further including:
    a stiffener extending from said elongated duct to the associated main duct.

11. The apparatus as described in claim 10 wherein:
    said elongated duct is a truncated conical shaped duct.

12. The apparatus as described in claim 11 wherein:
    said ring members are joined successively by adhesive bonding at peripheral portions thereof.

13. The apparatus as described in claim 12 further including:
    a damper disposed in said elongated duct.

14. Apparatus for joining a duct to a main duct which comprises:
    a bellows including a bendable generally planar first ring member manufactured of a first material, second and third generally planar ring members molded as one piece a second material, said second material being more flexible than said first material, and a fourth generally planar ring shaped member manufactured of a third material, said third material being more rigid than said first material, said first, second, third and fourth ring members being successively joined together to form said bellows.

15. The apparatus as described in claim 14 further including:
    means joining said first, second, third, and fourth ring members at two diametrically opposed points on said ring members.

16. The apparatus as described in claim 15 wherein:
    said means joins said ring members in closely spaced relationship at the juncture with said means.

17. The apparatus as described in claim 16 wherein:
    the associated main duct is circular and said first ring member is disposed in generally tangential relationship at least at initial installation and said means are disposed at points of tangency between said first ring member and the associated main duct.

18. The apparatus as described in claim 17 wherein:
    said first and third materials are metals.

19. The apparatus as described in claim 18 wherein:
    said second material is a fabric.

20. The apparatus as described in claim 19 wherein:
    said second material is fabricated from a glass fiber and is coated with neoprene.

21. The apparatus as described in claim 20 wherein:
    said second material is a deformable aluminum.

22. Apparatus for joining a rectangular duct to a round main duct which comprises:
    first, second, third and fourth generally planar substantially rigid members which are respectively at least portions of respectively first, second, third, and fourth walls of a generally rectangular cross section duct, said first and second walls each including a more flexible section, said first and second planar members being disposed in opposed spaced relationship, said third and fourth planar members being disposed in opposed spaced relationship, said fitting including bendable flanges extending from said more flexible sections of said first and second walls and also from said third and fourth walls adjacent to said flanges on said first and second walls.

* * * * *